United States Patent
Camus et al.

(10) Patent No.: US 7,599,524 B2
(45) Date of Patent: Oct. 6, 2009

(54) METHOD AND APPARATUS FOR PROVIDING A ROBUST OBJECT FINDER

(75) Inventors: Theodore A. Camus, Mount Laurel, NJ (US); Richard Wildes, Toronto (CA)

(73) Assignee: Sarnoff Corporation, Princeton, NJ (US)

( * ) Notice: Subject to any disclaimer, the term of this patent is extended or adjusted under 35 U.S.C. 154(b) by 501 days.

(21) Appl. No.: 10/818,307

(22) Filed: Apr. 5, 2004

(65) Prior Publication Data

US 2004/0197011 A1    Oct. 7, 2004

Related U.S. Application Data

(60) Provisional application No. 60/460,305, filed on Apr. 4, 2003.

(51) Int. Cl.
*G06K 9/00* (2006.01)
*G06K 9/46* (2006.01)
*G06K 9/66* (2006.01)

(52) U.S. Cl. .................................. 382/117; 382/195
(58) Field of Classification Search .................. None
See application file for complete search history.

(56) References Cited

U.S. PATENT DOCUMENTS

| | | | | |
|---|---|---|---|---|
| 3,993,888 A * | 11/1976 | Fellman | ................... | 382/272 |
| 4,109,237 A * | 8/1978 | Hill | ................... | 382/117 |
| 4,641,349 A * | 2/1987 | Flom et al. | ................... | 382/117 |
| 5,835,616 A * | 11/1998 | Lobo et al. | ................... | 382/118 |
| 5,953,440 A * | 9/1999 | Zhang et al. | ................... | 382/117 |
| 6,204,858 B1 * | 3/2001 | Gupta | ................... | 345/600 |
| 6,247,813 B1 * | 6/2001 | Kim et al. | ................... | 351/206 |
| 6,252,976 B1 * | 6/2001 | Schildkraut et al. | ........ | 382/117 |
| 6,301,370 B1 * | 10/2001 | Steffens et al. | ........... | 382/103 |
| 6,307,954 B1 * | 10/2001 | Suzaki | ................... | 382/117 |
| 6,526,160 B1 * | 2/2003 | Ito | ................... | 382/117 |
| 6,549,644 B1 * | 4/2003 | Yamamoto | ............. | 382/118 |
| 6,614,919 B1 * | 9/2003 | Suzaki et al. | ............. | 382/117 |
| 6,714,665 B1 * | 3/2004 | Hanna et al. | ............. | 382/117 |
| 6,836,554 B1 * | 12/2004 | Bolle et al. | ................... | 382/116 |
| 6,895,103 B2 * | 5/2005 | Chen et al. | ................... | 382/117 |
| 6,912,298 B1 * | 6/2005 | Wilensky | ................... | 382/117 |
| 7,099,495 B2 * | 8/2006 | Kodno et al. | ............. | 382/117 |
| 7,130,453 B2 * | 10/2006 | Kondo et al. | ............. | 382/117 |
| 7,146,027 B2 * | 12/2006 | Kim et al. | ................... | 382/117 |
| 7,295,686 B2 * | 11/2007 | Wu | ................... | 382/117 |
| 7,310,443 B1 * | 12/2007 | Kris et al. | ................... | 382/167 |
| 2002/0150280 A1 * | 10/2002 | Li | ................... | 382/117 |

(Continued)

OTHER PUBLICATIONS

Wildes, Richard. "Iris Recognition: An Emerging Biometric Technology". Feb. 15, 1997.Proceedings of the IEEE,vol. 85, No. 9. pp. 1348-1363.*

(Continued)

*Primary Examiner*—Andrew W Johns
*Assistant Examiner*—Mia M Thomas
(74) *Attorney, Agent, or Firm*—Lowenstein Sandler PC

(57) ABSTRACT

A method of quickly and robustly localizing a pair of concentric circular region boundaries in a digital image, such as the pupil and iris boundaries in an image of a human eye is disclosed. Specularities in the image are optionally filled. An object containing concentric regions, e.g., a pupil and iris, is found within the image.

16 Claims, 5 Drawing Sheets

U.S. PATENT DOCUMENTS

| | | | | |
|---|---|---|---|---|
| 2002/0154794 | A1* | 10/2002 | Cho | 382/117 |
| 2004/0146187 | A1* | 7/2004 | Jeng | 382/117 |
| 2005/0047655 | A1* | 3/2005 | Luo et al. | 382/167 |
| 2005/0088200 | A1* | 4/2005 | Takekuma et al. | 326/30 |
| 2006/0222212 | A1* | 10/2006 | Du et al. | 382/115 |
| 2007/0036397 | A1* | 2/2007 | Hamza | 382/117 |
| 2007/0047770 | A1* | 3/2007 | Swope et al. | 382/115 |

OTHER PUBLICATIONS

Daugman, John. "How Iris Recognition Works". Jun. 13, 2003. IEEE Transactions on Circuits and Systems for Video technology, vol. 14, No. 1.*

Weisstein E. et al.; "Circle" From MathWorld—A Wolfram Web Resource. www.mathworld.wolfram.com/circle.html, pp. 1 to 8.* www.m-w.com—definition- "ellipse" (Refer to Ellipse Illustration; also attached) pp. 1 of 2.*

Google Scholar Search—"Rida Hadma" pp. 1 of 2.*

Betke, et al., "Preliminary Investigation of Real-time Monitoring of a Driver in City Traffic," IEEE Intelligent Vehicles Syposium, Oct. 3-5, 2000, Dearborn, MI, 563-568.

Burt, et al., "The Laplacian Pyramid as a Compact Image Code," IEEE Transactions on Communications, 31(4): 532-540, 1983.

Daugman, J., "Recognizing Persons by Their Iris Patterns," in Biometrics: Personal Indentification in a Networked Society, A.K. Jain, et al., eds. Kluwer Academic Pub. 1999.

DellaVecchia, et al., "Methodology and apparatus for using the human iris as a robust biometric," Ophthalmic Technologies VIII, SPIE Biomedical Optics Society, Photonics West Conference, San Jose, CA Jan. 24, 1998.

Haro, et al., "Detecting and Tracking Eyes By Using Their Physiological Properties, Dynamics and Appearance," CVPR 2000, 163-168.

Hutchinson, et al., "Human-Computer Interaction Using Eye-Gaze Input," IEEE Transaction on Systems, Man and Cybernetics, 19(6): 1527-1534, 1989.

Jacob, R., "The Use of Eye Movements in Human-Computer Interaction Techniques: What you Look At is What you Get," ACM Trans. Info.Sys., 9(3):152-169.

Negin, et al., "An Iris Biometric System for Public and Personal Use," IEEE Computer, pp. 70-75, Feb. 2000.

van der Wal, et al., "The Acadia Vision Processor," IEEE International Workshop on Computer Architecture for Machine Perception, pp. 31-40, Padova, Italy, Sep. 11-13, 2000.

Wildes, R., "Iris Recognition: An Emerging Biometric Technology," Proc. IEEE, 85(9):1348-1363, Sep. 1997.

* cited by examiner

METHOD AND APPARATUS FOR PROVIDING A ROBUST OBJECT FINDER

CROSS-REFERENCE TO RELATED APPLICATIONS

This application claims benefit of U.S. provisional patent application Ser. No. 60/460,305, filed Apr. 4, 2003, which is herein incorporated by reference.

GOVERNMENT RIGHTS IN THIS INVENTION

This invention was made with U.S. government support under contract number DABT63-00-C-1042. The U.S. government has certain rights in this invention.

BACKGROUND OF THE INVENTION

There are many uses associated with precisely localizing a subject's eye(s). Eye movement and eye gaze can be tracked for purposes of human-computer interaction, for example, moving a camera in accordance with a subject's gaze direction, or shifting headlights in a vehicle in accordance with a subject's gaze direction. Eye movement may be tracked to aid in research of cognitive development skills. Localizing a subject's eye(s) can be used in systems for monitoring the eyes of an automobile driver for purposes of determining driver drowsiness and driver attention. Finally, eye finding methods can be deployed in iris identification systems for secure banking and computer access applications.

Thus, there is a need in the art for a method to quickly and robustly localize the iris and pupil boundaries of a subject's eye, e.g., in close-up images. Such a method can be employed in iris identification, or for applications that must determine the subject's gaze direction, such as human-computer interaction or driver attentiveness determination.

SUMMARY OF THE INVENTION

In one embodiment, the present invention discloses a method that is implemented in computer vision software applications for quickly and robustly localizing a pair of concentric regions, e.g., concentric circular regions, in a digital image, such as the pupil and iris boundaries in an image containing a human eye. For applications of eye-finding, especially where active illumination is used, specularities in an image containing a subject's eye are generally filled prior to subsequent processing (although this is not required). In turn, an object containing concentric regions, e.g. an eye, is found within the image.

In one embodiment, the input to the algorithm consists of a single 640×480 greyscale image containing a single human eye. The human pupil and iris are modeled as a pair of concentric circles within this image. If specularities are expected in the image, they are filled in. The method finds four values $(x, y, r_p, \text{ and } r_i)$, i.e. the shared $(x, y)$ center of the pupil and iris, the pupil radius $r_p$ and the iris radius $r_i$.

In one embodiment, the first step is filling in specularities in the image, if they are expected in the image. This step is followed by computing a list of pupil candidates in the image. For each such candidate $(x, y)$, first the pupil radius $r_p$ is estimated, and then the iris radius $r_i$, is estimated, yielding a single quality measure for that $(x, y, r_p, \text{ and } r_i)$. A gradient search in $(x, y)$ space (with $r_p$ and $r_i$ recomputed at each updated spatial coordinate) is then performed using this quality measure until a local maximum is reached. This process is repeated until all candidate pupils have been examined, yielding a final $(x, y, r_p, \text{ and } r_i)$ based on the overall quality measurement.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention consists of a method and apparatus for quickly and robustly localizing a pair of concentric region boundaries in a digital image, such as the pupil and iris boundaries in an image of a human eye. In the following description, the human eye is used as an example of a structure containing two concentric regions, however it should be noted that the applications developed could be applied to other image-processing applications with similar characteristics.

Figure 1:
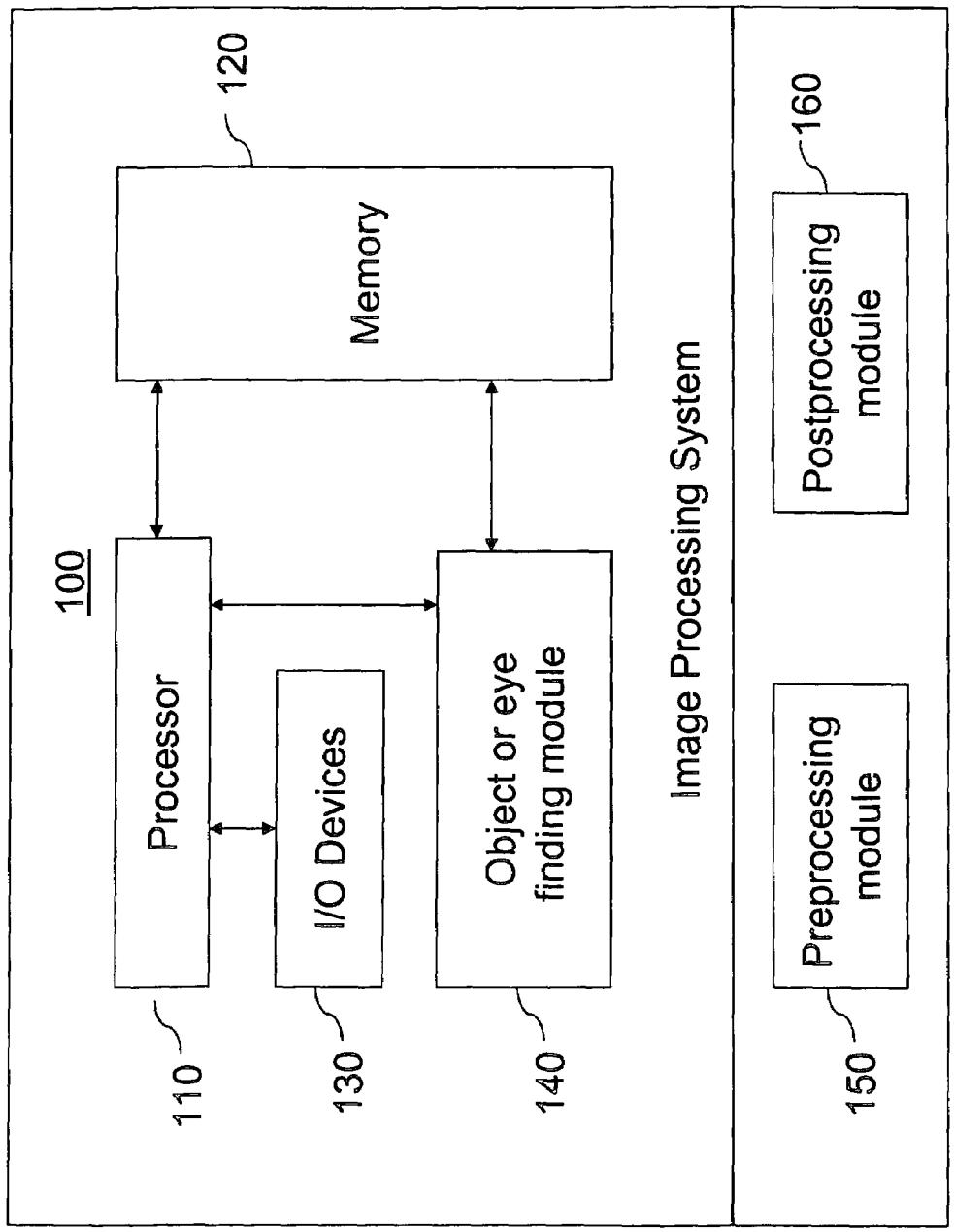
FIG. 1 illustrates an embodiment of a system in accordance with the present invention.

FIG. 1 illustrates a block diagram of an image processing device or system 100 of the present invention. Specifically, the system can be employed to process an image to locate the eye of a subject. In one embodiment, the image processing device or system 100 is implemented using a general purpose computer or any other hardware equivalents.

Thus, image processing device or system 100 comprises a processor (CPU) 110, a memory 120, e.g., random access memory (RAM) and/or read only memory (ROM), an eye (object) finding or localization module 140, and various input/output devices 130, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the eye finding or localization module 140 can be implemented as one or more physical devices that are coupled to the CPU 110 through a communication channel. Alternatively, the eye finding or localization module 140 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 120 of the computer. As such, the eye finding or localization module 140 (including associated data structures) of the present invention can be stored on a computer readable medium, e.g., RAM memory, magnetic or optical drive or diskette and the like.

FIG. 1 illustrates a system in accordance with one embodiment of the present invention. The present invention operates on an image having a subject's eye(s). Thus, a preprocessor 150 receives an image and localizes the eye in a wider-angle field of view image, e.g., using segmentation techniques coupled with skin tone detection techniques and so on. Of course, there are applications where a subject deliberately places his or her eye within an imaging device, e.g., in a banking or security application. In such situations, preprocessing of the input image to ensure that a subject's eye is in fact within the image is not necessary. Preprocessor or preprocessing module 150 subsequently captures a narrower field of view image containing the eye somewhere in the image. Object or eye finder module 140 locates a plurality of potential objects within the narrower field of view image. In one embodiment the plurality of potential objects are potential iris and pupil locations. Various image processing functions are then applied to the image as discussed below. Once the subject's eye is located, post processor or post processing module 160 may perform various operations utilizing the selected candidate object. For example, post processor 160 may use the selected candidate object for applications such as iris recognition and gaze direction determination, or other uses as determined by one who is skilled in the art or as discussed above. It should be noted that processing functions performed by preprocessor 150 and postprocessor 160 can be performed by dedicated modules situated inside or outside of system 100. In fact such functions can be loaded into memory 120 and operated by CPU 110.

Figure 2:
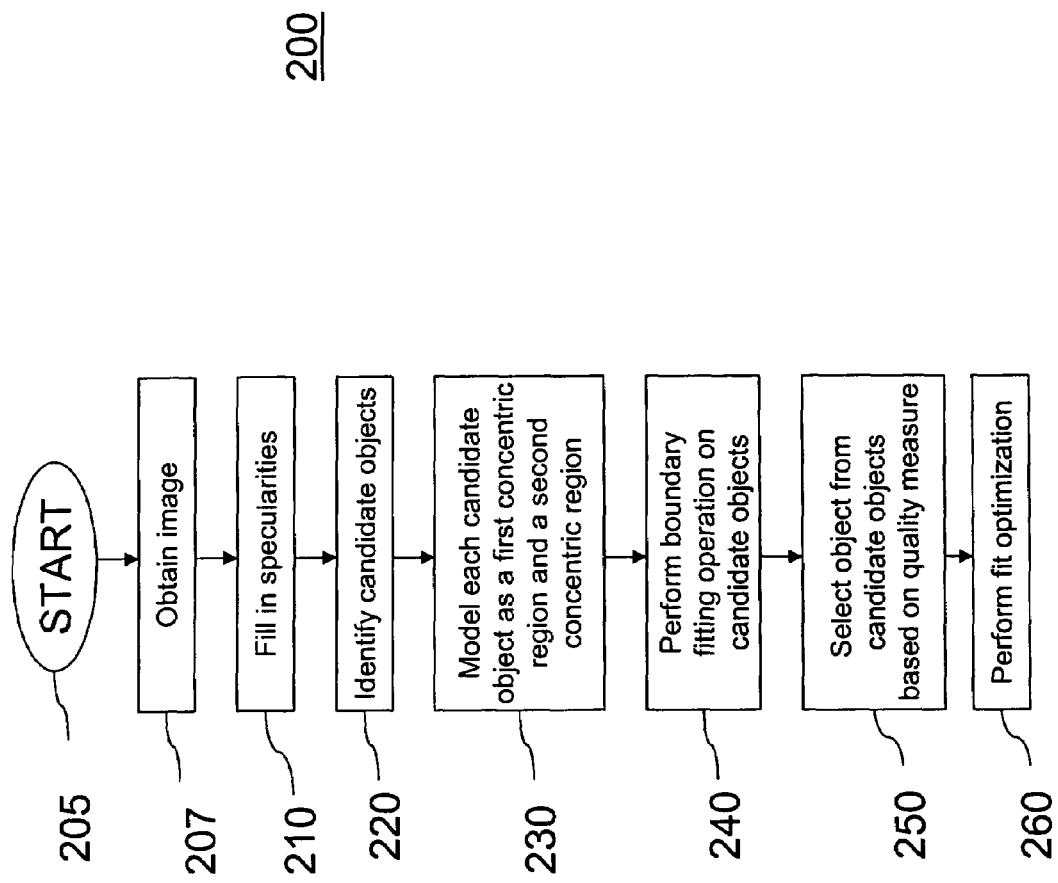
FIG. 2 illustrates a flow diagram in accordance with a method of the present invention.

FIG. 2 illustrates a diagram in accordance with a method 200 of the present invention. Method 200 starts in step 205 and proceeds to step 207. In step 207 an image is obtained from preprocessor 150 or from an imaging device 130.

Figure 3:
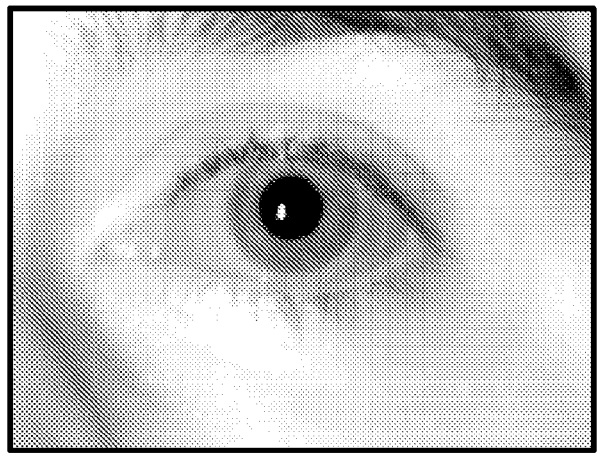
FIG. 3 illustrates an original eye image containing specularities.
Figure 4:
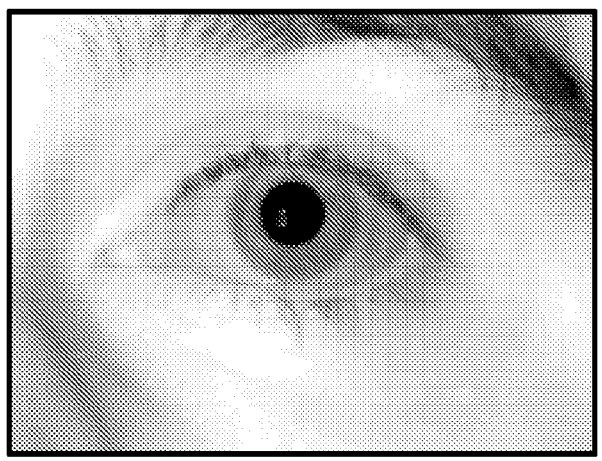
FIG. 4 illustrates an example of FIG. 3 after specularity filling.

In step 210 specularities are filled in, i.e., the influence of specularities in the image is attenuated. Specularities are very bright areas (typically saturated in the image) formed from reflections off the cornea or off the eye, or off the lenses of glasses or contacts. Specularities can disrupt a pupil-iris or iris-sclera boundary. Therefore, it is desirable to fill in specularities with nearby pixel values. Borderline pixels on the periphery of saturated pixels may also be filled in with nearby pixel values. Regions of the skin, such as on eyelids and the upper cheeks will contain specularities as well, depending on illumination and exposure time. Filling in of these regions typically neither helps nor hurts, however. In one embodiment, specularities are filled in by performing a linear grey-level interpolation between the starting and ending pixels of any saturated region (above a threshold, such as 250 out of a maximum pixel value of 255) within a single row. Then, a second bi-linear interpolation is performed in the vertical direction replacing no more than a single pixel, for any pixel immediately above or below any pixel touched in the first step. The second interpolation is performed to prevent the introduction of any obvious artifacts from the first step. FIG. 3 is an illustration of an original eye containing specularities. FIG. 4 shows the image of FIG. 3 after specularity filling.

Figure 5:
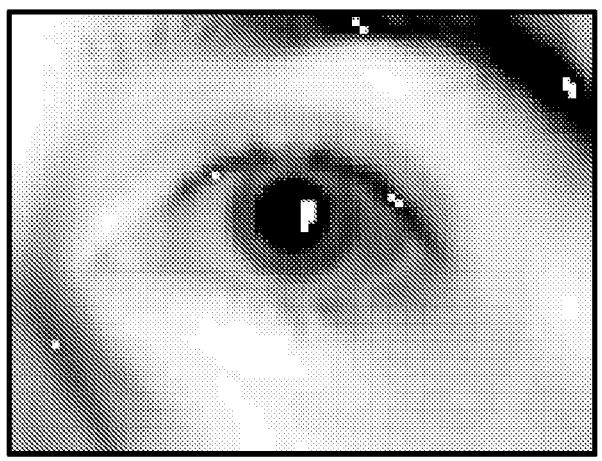
FIG. 5 illustrates identified candidate objects.

In step 220 candidate objects are identified. In one embodiment suited to eye-finding, two tests are applied to identify candidate objects. For the first test, if the object is a minimum in a 5×5 local region, that object will be marked as a candidate object. Large areas which are dark, for example, an entire pupil or entire region of candidates will thus be reduced to a single candidate. This test greatly reduces the amount of candidates thus providing a computational advantage. The initial image is processed with a function that recursively selects an object that is a minima (in terms of pixel intensity value) e.g., in a 5×5 local region of the image. A second test may then be applied in order to eliminate more potential candidates. In the application of eye-finding, pixels that are less than half the maximum intensity value are selected. In an 8 bit pixel, the intensity value would be limited to 128 or less. This test is particularly appropriate to applications of eye-finding where active infra-red illumination is used, because human flesh tends to reflect infrared very well due to its natural warmth and thus shows up brighter in the infrared wavelengths. A great deal of the region of the eye can therefore be eliminated by this second test. FIG. 5 illustrates an example of identified candidate objects. The candidate objects are marked in white (for visibility).

In step 230, each candidate object is modeled as a first concentric region and a second concentric region. In one embodiment, the pair of concentric regions is represented by the pupil and iris boundaries of an eye. In one embodiment, the first and second concentric regions are concentric circles. In another embodiment one of the concentric regions may be a circle and the other concentric region may be an ellipse. In yet another embodiment, both concentric regions may be modeled as ellipses.

Each candidate object is modeled as a first concentric circular region and a second concentric circular region, e.g., a pupil and an iris. While biological structures are rarely so neatly packaged, this modeling of the pupil and iris is a sufficient approximation for the purposes of the present invention. The method provides for finding four values for each candidate object: x, y, $r_p$, and $r_i$, with x and y representing the shared center of the pupil and iris, $r_p$ being the pupil radius, and $r_i$ being the iris radius. Various structure size and contrast ratios are used to penalize candidate solutions with unusually extreme characteristics, such as an excessively large pupil-to-iris diameter ratio, in some proportion to the severity of the characteristic.

In step 240, boundary fitting of the candidate objects is performed. In one embodiment, an optional step of forming a Gaussian pyramid may be performed in order to produce additional low resolution images. From the full resolution image, additional low resolution images are created. Each subsequent level is typically a factor of two smaller on each axis. Forming a Gaussian pyramid produces the same image at multiple resolution scales and enables coarse-to-fine processing, which provides computational advantages. For example, pyramid generation or processing (Gaussian pyramid) may reduce a 640×480 full-resolution greyscale image to an 80×60 image. Initially, the boundary fit is performed on the lowest resolution image produced. The result may then be used as initial conditions for a refined fit on a higher resolution image and so on until the full resolution image is reached. A single resolution approach may be employed however results may be more reliable if a multi-resolution approach is used.

Figure 6A:
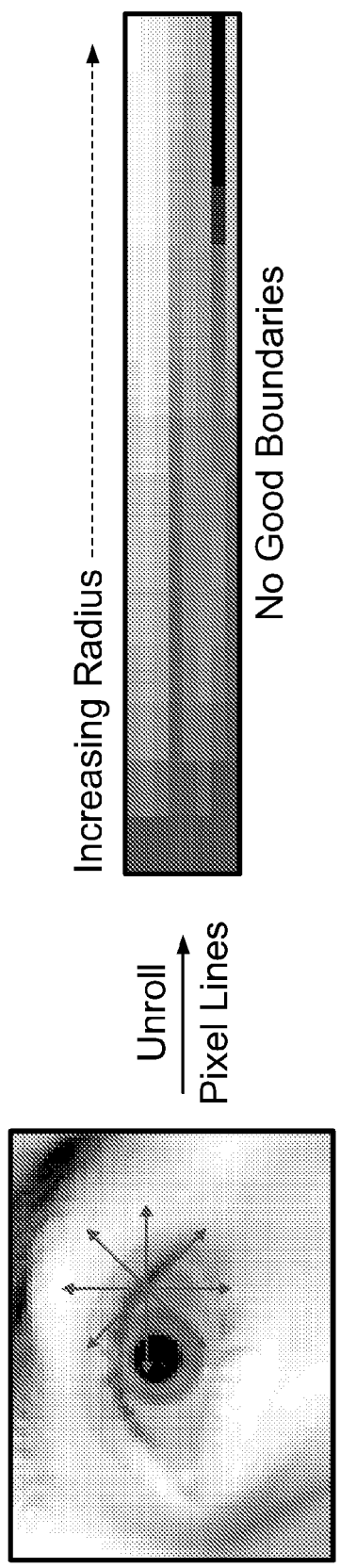
FIG. 6A illustrates the mapping of radial rays into a rectangular representation for a candidate object.
Figure 6B:
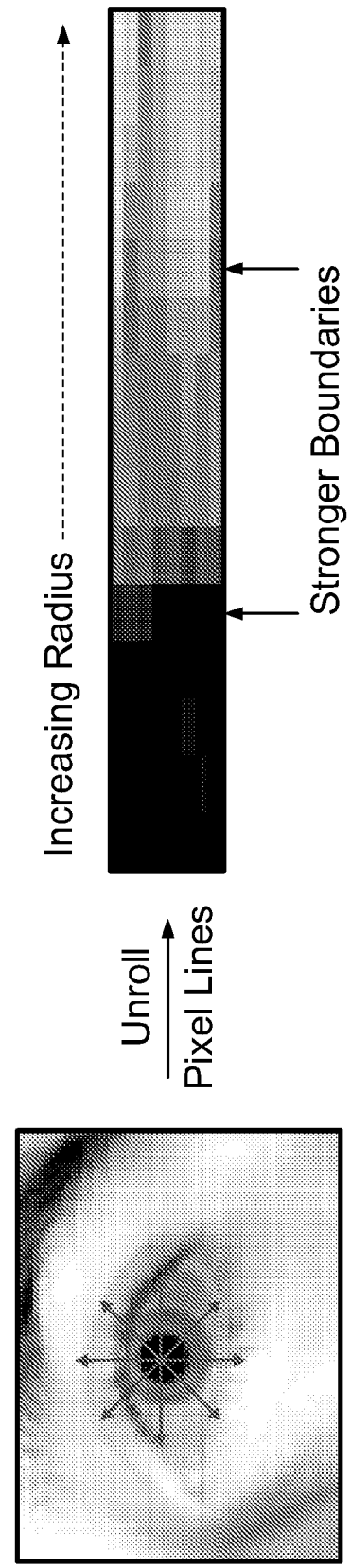
FIG. 6B illustrates the mapping of radial rays into a rectangular representation for a candidate object.

A set of rays, or "spokes", radiating from the proposed center of each candidate object, are unrolled in clockwise order into a convenient rectangular representation, with increasing radius (i.e., distance from the pupil center) along the x-axis, and with one row per spoke. The radial rays represent "unrolled" pixel lines. Straightforward linear interpolation is used when needed to properly account for the fixed square tessellation-of the image array. If a candidate pupil center is in the actual center of an eye, the pupil/iris boundaries for all of the unrolled pixel lines for a particular candidate should be approximately equidistant from the center of the eye, forming a vertical edge in the rectangular representation. The iris/sclera boundary should also be approximately equidistant from the center of the eye for each unrolled pixel line for a particular candidate. FIG. 6A illustrates the mapping of radial rays into a rectangular representation for a candidate object. In this situation, a particular candidate object does not represent an eye. As the radius increases, no pupil/iris boundary is found. FIG. 6B illustrates the mapping of radial rays into a rectangular representation for a candidate object. Here, the pupil and iris boundaries are clear and appear to be vertical edges in this rectangular representation.

The following embodiment assumes circular pupils and irises. However, the present invention could perform elliptical modeling of the iris as well as the pupil.

Figure 7:
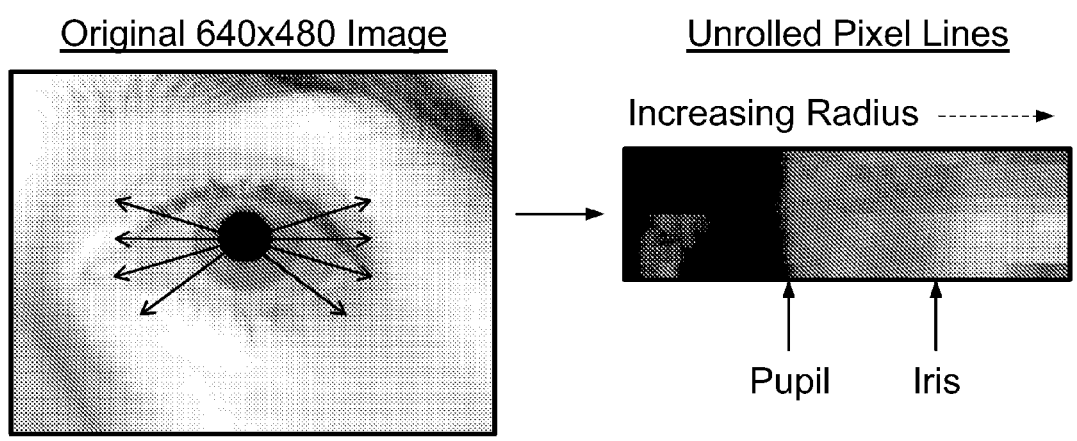
FIG. 7 illustrates the mapping of radial rays for the pupil and iris boundaries in the full-resolution, original image.

For each fixed {x,y} location on the image, the computed object or pupil radius r is that which maximizes a measure of gradient strength g and strength uniformity across all spokes, as shown in the following equation:

$$\max_r \left( \sum_{i=1}^{n} \left( (n-1)\text{abs}(g_{i,r}) - \left( \sum_{j=i+1}^{n} \text{abs}(g_{i,r} - g_{j,r}) \right) - y_{i,r}/8 \right) \right) \quad (1)$$

Where n stands for the number of discrete values of the polar variable i that are considered (in the current embodiment, n=8), $g_{i,r}$ stands for the directional derivative (i.e., in the radial direction) of image intensity y at radius r for spoke index i. The first term, $(n-1)\text{abs}(g_{i,r})$, represents the weighted summed strength of the gradients along the boundary, the second term, $$\sum_{j=i+1}^{n} \text{abs}(g_{i,r} - g_{j,r}),$$

represents the uniformity of the gradients along the boundary, and the last term, $y_{i,r}/8$, reflects a slight preference for darker pupils. This is a one-dimensional search along the x-axis in the new representation, up to a maximum radius. Equation 1 yields a quality measure for each candidate object. In the example of eye-finding, the innermost concentric circle represents the pupil/iris boundary, which is located before the outer iris/sclera boundary. The iris/sclera boundary is then found in a similar fashion as the pupil/iris boundary with two important exceptions: 1) the starting search radius is set to that of the pupil/iris boundary, plus a small increment; 2) the "spokes" that are unrolled can be different from that of the pupil. In particular, the spokes for the pupil can be arranged equally about a circular arc, but those of the iris can be concentrated in the lateral regions to avoid eyelid occlusion. At the highest resolutions, it is often desirable to find both the pupil/iris and the iris/sclera boundaries using the more laterally oriented spokes to avoid eyelid occlusion, which is more of a problem at finer feature scales, than it is at coarser feature scales. FIG. 7 illustrates the mapping of radial rays for the pupil and iris boundaries, when computed at the highest image resolution.

Alternatively, the iris/sclera boundary may be found first, and the pupil/iris boundary found second. It is often simply convenient to find the strongest pair of boundaries, and label the boundary with the shorter radius as the pupil/iris boundary and the boundary with the longer radius the iris/sclera boundary.

In step 250, an object is selected from the candidate objects based on the quality measure. A gradient search in (x, y) space (with $r_p$ and $r_i$ recomputed at each updated spatial coordinate) is then performed using the quality measure until a local maximum is reached. This process is repeated until all candidate objects have been examined, yielding a final (x, y, $r_p$, $r_i$) describing the pair of concentric boundaries with the locally maximum quality measure.

For each candidate object identified, as well as four additional locations situated 3 pixels away from the candidate object center in the north, east, west, and south ("NEWS") directions, a gradient search is then performed to more precisely localize the eye location. While performing the gradient search on the four additional NEWS locations in addition to the candidate object center increases the total computational load, it provides increased robustness in the most difficult cases involving specularities on glasses.

At each step of this gradient search, the pupil and iris quality measures are calculated for all locations in a 3×3 pixel window centered at the current location. The current location is updated to the optimal pupil/iris measure in any of the 8 adjacent locations. This step is repeated until a local maxima (in terms of the pupil/iris and iris/sclera boundary quality measures of equation (1)) is found. While performing the gradient search on the four additional NEWS locations in addition to the local minima increases the total computational load, it provides increased robustness in the most difficult cases involving specularities on glasses.

The overall quality measure of a combined candidate pupil and iris boundary solution is a simple sum of the two, optionally modulated by several penalty factors. In one embodiment, the first penalty factor helps constrain the iris-pupil solution to lie within expected radii ratios. In particular, if the iris-pupil radii ratio is greater than 4.0, or less than 1.75, then the quality measure is multiplied by a ratio of $(4.0/\text{ratio})^3$ or $(\text{ratio}/1.75)^3$, respectively. The particular form of this penalty was developed empirically to avoid the extremes of iris and pupil diameter combinations that are unlikely to occur with normal human eyes, while still providing a graceful degradation of performance for such extremes if and when they do occur.

In one embodiment, a second penalty reflects the observation that the average iris intensity, iris, is generally greater than the average pupil intensity, pupil. In cases where this is not true, the quality measure is multiplied by $(\text{iris-pupio})^2$. This factor is applied to prevent the pupil boundary finder from latching onto a very bright region, such as a specularity, since even a filled specularity can have a strong edge gradient. While it is not always true that the iris is brighter than the pupil, this particular penalty factor also degrades gracefully with exceptions to this rule. While these heuristics were found to be effective for purposes of eye-finding, other possibilities could be implemented depending on the application.

In one embodiment, the number n of spokes equals 8, and an estimate $g_{i,r}$ of the gradient at radius r on spoke index i is computed by:

$$g_{i,r} = \sum_{k=m/2}^{m+m/2} (s_{i,r+k} - s_{i,r-k}) \quad (2)$$

Where $S_{i,r}$ equals the pixel value for spoke index i at radius r, and m=8 for 640×480 images and m=1 for 80×60 images. This models the boundary as a simple step-edge, summing up two one-dimensional regions of m pixels, each m/2 pixels away from the center of the step, and taking the difference between the two sums. This may be viewed as a simple [−1 0 1] edge detector, scaled by m pixels.

Ultimately as referred to in step 250, the (x, y, $r_p$, $r_i$) solution with the strongest measure (from equation (1) as applied to both $r_p$ and $r_i$) is selected as the eye location and radius at a given resolution level. In step 260, in the present embodiment, this single solution at the coarsest 80×60 representation is fed to the highest 640×480 resolution representation, where the same gradient search is run to optimize the final eye position and pupil and iris radii. In this embodiment an optimal concentric-circular model fit is found over two levels of the Gaussian pyramid, although more intermediate levels could be used depending on the circumstances.

The pupil can be modeled as a either a concentric circle or alternatively as a concentric ellipse. Thus, elliptical pupil boundary fitting may also be accomplished. Elliptical pupil boundary fitting is accomplished by beginning with an optimal concentric circular fit, yielding (x, y, $r_i$, $r_p$) in the high resolution image. The pupil can be modeled as an ellipse of the form:

$$r_p' = r_p/(1+\epsilon(1+\cos(2(\phi+\theta)))) \quad (3)$$

where $r_p$ is the half-length of the elliptical pupil's major axis, $\epsilon$ is a measure of eccentricity, $\phi$ is the angle of the minor axis, $\theta$ is the angle of the ray from the pupil center to the ellipse representing the pupil, and $r_p'$ is the length of the ray from the point on the ellipse at angle $\phi+\theta$.

The boundary goodness of fit is computed in the same manner as for the circular pupil embodiment. A brute-force search over $\phi$ and $\epsilon$ is performed to find optimal elliptic pupil fit at point (x,y). A local spatial gradient search is performed to find the best overall fit. This optimal fit will return (x,y), $r_i$, $\phi$, $\epsilon$, and $r_p$.

Those skilled in the art would recognize that the present invention could be used to perform eyelid detection. An eyelid could be detected performing the same "spoke unrolling" approach used for pupil/iris localization. This would occur only once, after the iris and pupil are found. Since the process would only be done once, it is possible to use a much larger amount of data (i.e., spokes) than for pupil and iris boundary detection and yield high accuracy for minimal performance impact.

The method of the present invention is capable of running very quickly, currently averaging over 55 Hz on a 450 MHz UltraSPARC-II processor, making it practical for commercial use even without special-purpose hardware. However, it should be noted that since multi-resolution pyramid processing may be used, a significant portion of the computation could be accelerated in hardware such as the Acadia™ chip.

The method of the present invention does not require the use of the location of any specularities to assist in the localization of the pupil or iris. The presence of a very bright glint on or very near a very dark pupil would be of great aid in the search for the eye, however due to the unconstrained nature of the problem, this cannot be guaranteed. Thus, this method is more flexible than those requiring specularities to find the eye. However, the method works well even in the presence of specularities, which can occlude portions of the eye.

The method has been shown perform well even on poorly illuminated images; this has the advantage of lowering the illumination power requirement of a complete system. In addition, it may be very difficult to adequately illuminate an eye at significant distances (such as 10 meters), which increases the importance of a method that does not require a great deal of illumination.

While foregoing is directed to the preferred embodiment of the present invention, other and further embodiments of the invention may be devised without departing from the basic scope thereof.

The invention claimed is:

1. A computer-implemented method of finding an object within an image, comprising:
    locating, by an object module, a plurality of candidate objects in the image;
    modeling, by a processing module, each candidate object as a first concentric region and a second concentric region;
    performing, by the processing module, boundary fitting on the plurality of candidate objects, wherein performing boundary fitting on the plurality of candidate objects further comprises: configuring a plurality of rays into a rectangular representation for each candidate object and computing for each candidate object a first boundary and a second boundary in order to determine a quality measure of each candidate object, wherein said computing comprises estimating the first boundary from said rectangular representation, said first boundary corresponds to the first concentric region and estimating a second boundary from said rectangular representation, said second boundary corresponds to the second concentric region; and
    selecting, by the processing module, the object from the plurality of candidate objects in accordance with the quality measure.

2. The method of claim 1, wherein the plurality of rays radiate from a proposed center of each canidate.

3. The method of claim 2, wherein the plurality of rays represent pixel lines.

4. The method of claim 1, wherein selecting by the processing module the object from the plurality of candidate objects further comprises selecting the candidate object having a maximum quality measure.

5. The method of claim 1 further comprising filling in at least one specularity in the image.

6. The method of claim 1 wherein said performing boundary fitting comprises performing a gradient search on the plurality of candidate objects, using the quality measure, until a local maximum is reached.

7. The method of claim 1, wherein at least one of the first concentric region and second concentric region is modeled as an ellipse.

8. The method of claim 7 wherein said ellipse is a circle.

9. The method of claim 1 further comprising performing pyramid processing on the image in order to reproduce the image in a plurality of resolutions.

10. The method of claim of claim 1, further comprising performing fit optimization on the selected object in a higher resolution image.

11. The method of claim 1 wherein said plurality of rays represent the first concentric region and the second concentric region.

12. The method of claim 1 wherein said plurality of rays comprise a first set of rays and a second set of rays such that the first set of rays represent the first concentric region and the second set of rays represent the second concentric region.

13. A computer-readable medium having stored thereon a plurality of instructions for finding an object within an image, the plurality of instructions including instructions which:

locate a plurality of candidate objects in the image; model each candidate object as a first concentric region and a second concentric region; perform boundary fitting on the plurality of candidate objects, wherein performing boundary fitting on the plurality of candidate objects further comprises: configuring a plurality of rays into a rectangular representation for each candidate object and computing for each candidate object a first boundary and a second boundary in order to determine a quality measure of each candidate object, wherein said computing comprises estimating the first boundary from said rectangular representation, said first boundary corresponds to the first concentric region and estimating a second boundary from said rectangular representation, said second boundary corresponds to the second concentric region; and select the object from the plurality of candidate objects in accordance with the quality measure.

14. The computer-readable medium of claim 13 wherein said plurality of rays comprise a first set of rays and a second set of rays such that the first set of rays represent the first concentric region and the second set of rays represent the second concentric region.

15. A device for finding an object within an image, comprising:

means for locating a plurality of candidate objects in the image;

means for modeling each candidate object as a first concentric region and a second concentric region;

means for performing boundary fitting on the plurality of candidate objects, wherein means for performing boundary fitting further comprises: means for configuring a plurality of rays into a rectangular representation for each candidate object; and means for computing for each candidate a first boundary and a second boundary in order to determine a quality measure of each candidate object, wherein said means for computing further comprises means for estimating the first boundary from said rectangular representation, said first boundary corresponds to the first concentric region and means for estimating a second boundary from said rectangular representation, said second boundary corresponds to the second concentric region; and means for selecting the object from the plurality of candidate objects in accordance with the quality measure.

16. The device of claim 15 wherein said plurality of rays comprise a first set of rays and a second set of rays such that the first set of rays represent the first concentric region and the second set of rays represent the second concentric region.

* * * * *